United States Patent
Bessemer et al.

(10) Patent No.: US 10,525,615 B2
(45) Date of Patent: Jan. 7, 2020

(54) WATER REGULATED TEMPERATURE CONTROLLED RESIN DRYING

(71) Applicant: Novatec, Inc., Baltimore, MD (US)

(72) Inventors: Conrad Bessemer, Millersville, MD (US); Thomas Trevor Bludis, Reisterstown, MD (US); James Zinski, Ellicot City, MD (US); Mark Haynie, Pasadena, MD (US)

(73) Assignee: Novatec, Inc., Baltimore, MD (US)

( * ) Notice: Subject to any disclaimer, the term of this patent is extended or adjusted under 35 U.S.C. 154(b) by 130 days.

(21) Appl. No.: 15/887,103

(22) Filed: Feb. 2, 2018

(65) Prior Publication Data

US 2019/0105806 A1   Apr. 11, 2019

Related U.S. Application Data

(63) Continuation-in-part of application No. 29/635,146, filed on Jan. 29, 2018.

(60) Provisional application No. 62/570,864, filed on Oct. 11, 2017.

(51) Int. Cl.
| | |
|---|---|
| *B29B 13/06* | (2006.01) |
| *F26B 21/10* | (2006.01) |
| *F26B 21/08* | (2006.01) |
| *F26B 23/00* | (2006.01) |
| *F26B 3/06* | (2006.01) |
| *F26B 21/00* | (2006.01) |
| *F26B 21/04* | (2006.01) |

(52) U.S. Cl.
CPC .............. *B29B 13/065* (2013.01); *F26B 3/06* (2013.01); *F26B 21/003* (2013.01); *F26B 21/04* (2013.01); *F26B 21/083* (2013.01); *F26B 21/10* (2013.01); *F26B 23/001* (2013.01); *F26B 2200/08* (2013.01)

(58) Field of Classification Search
CPC .......... B29B 13/065; F26B 3/06; F26B 21/04; F26B 23/001
See application file for complete search history.

(56) References Cited

U.S. PATENT DOCUMENTS

| | | | | |
|---|---|---|---|---|
| 3,233,416 | A * | 2/1966 | Rainwater | B29C 49/58 62/5 |
| 4,601,114 | A * | 7/1986 | Noguchi | B01D 53/261 34/451 |
| 4,670,203 | A * | 6/1987 | Chang | B29C 45/0001 264/40.6 |
| 7,316,079 | B2 * | 1/2008 | Kawase | B29B 13/065 34/412 |

(Continued)

*Primary Examiner* — David J Laux
(74) *Attorney, Agent, or Firm* — Fox Rothschild LLP

(57) ABSTRACT

Apparatus and method for drying thermoplastic resin prior to molding into plastic parts comprises a continuous loop liquid circuit for furnishing liquid at a prescribed temperature to a mold in which the plastic parts are fabricated; a continuous loop air circuit for passing heated dry air through a hopper containing the thermoplastic resin thereby drying the thermoplastic resin to a prescribed level of dryness; and a coupling thermally connecting the two circuits for heat transfer from the liquid to the drying air; the liquid is selected from the group comprising water and ethylene glycol; microprocessor control facilitates generation and retention of custom water temperature and resin dryness/temperature optionally based on machine learning principles.

3 Claims, 4 Drawing Sheets

(56) References Cited

U.S. PATENT DOCUMENTS

| | | | |
|---|---|---|---|
| 7,568,905 B2* | 8/2009 | Cooke | B29C 45/7666 |
| | | | 425/388 |
| 10,343,323 B2* | 7/2019 | Chopinez | B29B 13/065 |
| 2007/0212531 A1* | 9/2007 | McIntyre | B29B 17/0042 |
| | | | 428/297.4 |
| 2019/0054660 A1* | 2/2019 | Maguire | F26B 3/06 |

* cited by examiner

WATER REGULATED TEMPERATURE CONTROLLED RESIN DRYING

CROSS-REFERENCE TO RELATED PATENT APPLICATION

This patent application claims, under 35 USC 120, the benefit of the priority of co-pending U.S. provisional patent application Ser. No. 62/570,864 filed 11 Oct. 2017 and entitled "Dryer for Thermoplastic Resin with Water Process Temperature Control."

This patent application is a 35 USC 120 continuation-in-part of, and claims the priority of, co-pending U.S. patent application Ser. No. 29/635,146 filed 29 Jan. 2018, entitled "Resin Drying Apparatus."

STATEMENT REGARDING FEDERALLY SPONSORED RESEARCH OR DEVELOPMENT

Not applicable

DESCRIPTION OF THE INVENTION

Figure 1:
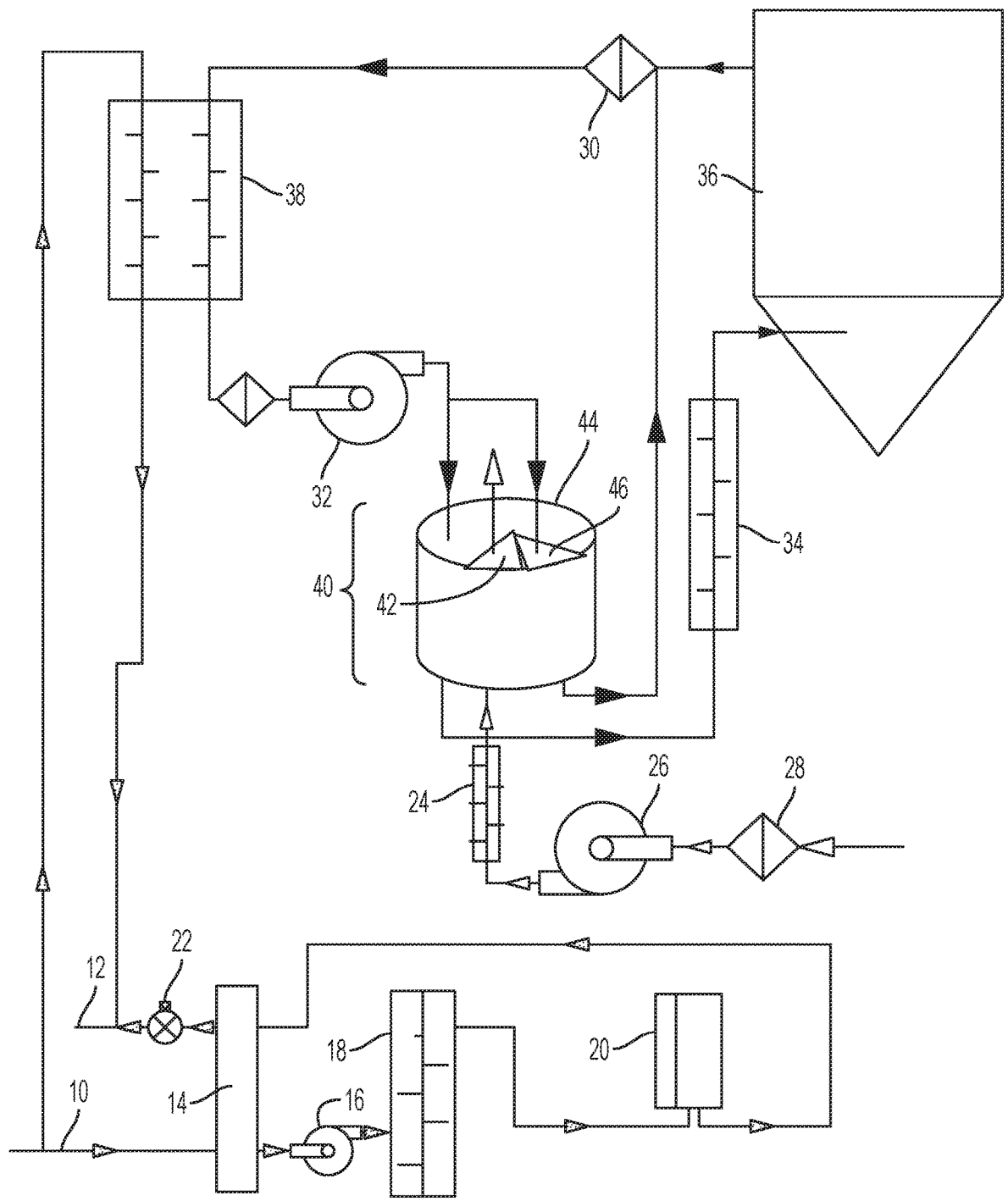
FIG. 1 is a schematic flow chart illustrating operation of a desiccant wheel dryer with an integral process temperature control unit water circuit accorsing to the invention.

This invention relates to combining a plastic resin dryer and a water process temperature control unit into a single machine.

The invention has a water process temperature control unit circuit which preferably but not necessarily uses water or another liquid as its process fluid to cool or heat a mold of an injection molding machine or other plastic fabrication device such as an extruder. The water process temperature control unit circuit uses water from a supply and a return, which drain to a common drain line.

The invention has a drying circuit where air is preferably used as the process gas to remove moisture from resins used for molding and extrusion before the molding or extruding. In accordance with the invention, the drying circuit can be based on vacuum, membrane, desiccant honeycomb wheel, pelletized desiccant bed, or other drying technology.

At least one element of the drying circuit may desirably have its process air cooled with an air-to-water heat exchanger coil, supplied with a common supply of water and a return, which drain to a common drain line.

The invention preferably uses a single microcontroller for both drying and cooling circuits. The microcontroller is desirably preprogramed with recipes of processing parameters which may be material specific, and/or mold specific, and/or product specific. This "common" control system records process settings and eliminates the need for separate user input adjustments at user control locations on two different machines.

Having a single device with drying and water process temperature control allows optimum placement of the necessary system parts in close proximity to one another and allows a more compact arrangement than otherwise possible. Less floor space is required than for two function-specific devices and releases floor space in factories. This is apparent from co-pending application Ser. No. 29/635,146, where one implementation of such a device is disclosed.

A single device which has drying and water process temperature control in a single compact package in accordance with the invention is advantageous because there are fewer water and electrical hookups required. This simplifies installation and enhances mobility of the device.

A single device having material drying and water process temperature control in a single compact package on wheels in accordance with the invention is advantageous; operator efficiency improves because there is only one device to move versus two.

In addition, a device in accordance with the invention has a singular computerized control to regulate both the cooling and drying process so that both are matched precisely to the type of plastic part being made. Customized software creates a recipe for a particular part, where the recipe is inserted by the customer and then retained within the device so the recipe may be used the next time that part is made.

Most recipes have separate mold temperatures and dryer temperatures. The software created recipe greatly simplifies setup and avoids potential of mismatched setups between drying and cooling.

FIG. 1 is a schematic flow chart illustrating operation of a desiccant wheel dryer with an integral process temperature control unit water circuit according to the invention.

In FIG. 1:
  10 is a water supply.
  12 is a water return.
  14 is a mixing chamber.
  16 is a water pump.
  18 is a water heater.
  20 is a mold of an injection molding machine.
  22 is a solenoid water cooling valve.
  24 is a regeneration heater.
  26 is a regeneration blower.
  28 is a regeneration filter.
  30 is a process filter.
  32 is a process fan or blower.
  34 is a process heater.
  36 is a material drying hopper.
  38 is a post process water to air heat exchanger.
  40 is an entire desiccant wheel.
  42 is a regeneration portion of the desiccant wheel.
  44 is a process portion of the desiccant wheel.
  46 is a cooling air portion of the desiccant wheel.

Referring to FIG. 1, cold water enters at point 10, goes through mixing chamber 14, water pump 16, water heater 18, then through mold 20 of an injection molding machine and returns to mixing chamber 14, traveling all the while in a closed loop. Temperature sensors monitor the temperature of water going into the mold. If the water temperature is too cold, water heater 18 is energized; if the water temperature is too hot, solenoid water cooling valve 22 is opened to permit hot water to drain. This hot water is replenished from a colder water supply that lowers the temperature of the water going into mold 20 of an injection molding machine.

Still referring to FIG. 1, moist process air leaves material hopper 36, goes through process filter 30 and post process air cooler 38. After passing through pump 32, this moist process air splits. One portion passes through process portion 44 of the desiccant wheel 40 where it becomes dry and rejoins the air leaving hopper 36 going to post-process water-to-air heat exchanger 38. The other portion passes through process heater 34 and returns to material hopper 36 to remove additional moisture from the plastic pellets. Post-process air cooler (water-to-air heat exchanger) 38 cools the air and allows water vapor in the air to be more rapidly adsorbed on molecular sieve material and allows gaseous volatiles to condense (so as not to contaminate the desiccant) on the process portions of desiccant wheel 40. A supply of cool water is necessary for operation of the post process air cooler 38. The desiccant wheel 40 rotates slowly to allow water vapor to be absorbed and regenerated in a continuous process.

Still referring to FIG. 1, the most air is split after process blower 32. A portion of the air cools desiccant wheel 40 and rejoins the moist process air that is leaving drying hopper 36 before entering process filter 30.

Yet still referring to FIG. 1, the input ambient air is filtered using regeneration filter 28, then is pumped by fan or blower 26, then is heated by regeneration heater 24. This hot regeneration air excites water bound to the desiccant and removes water vapor from the regeneration portion 42 of the desiccant wheel 40. This wet, hot regeneration air is vented to atmosphere.

Figure 2:
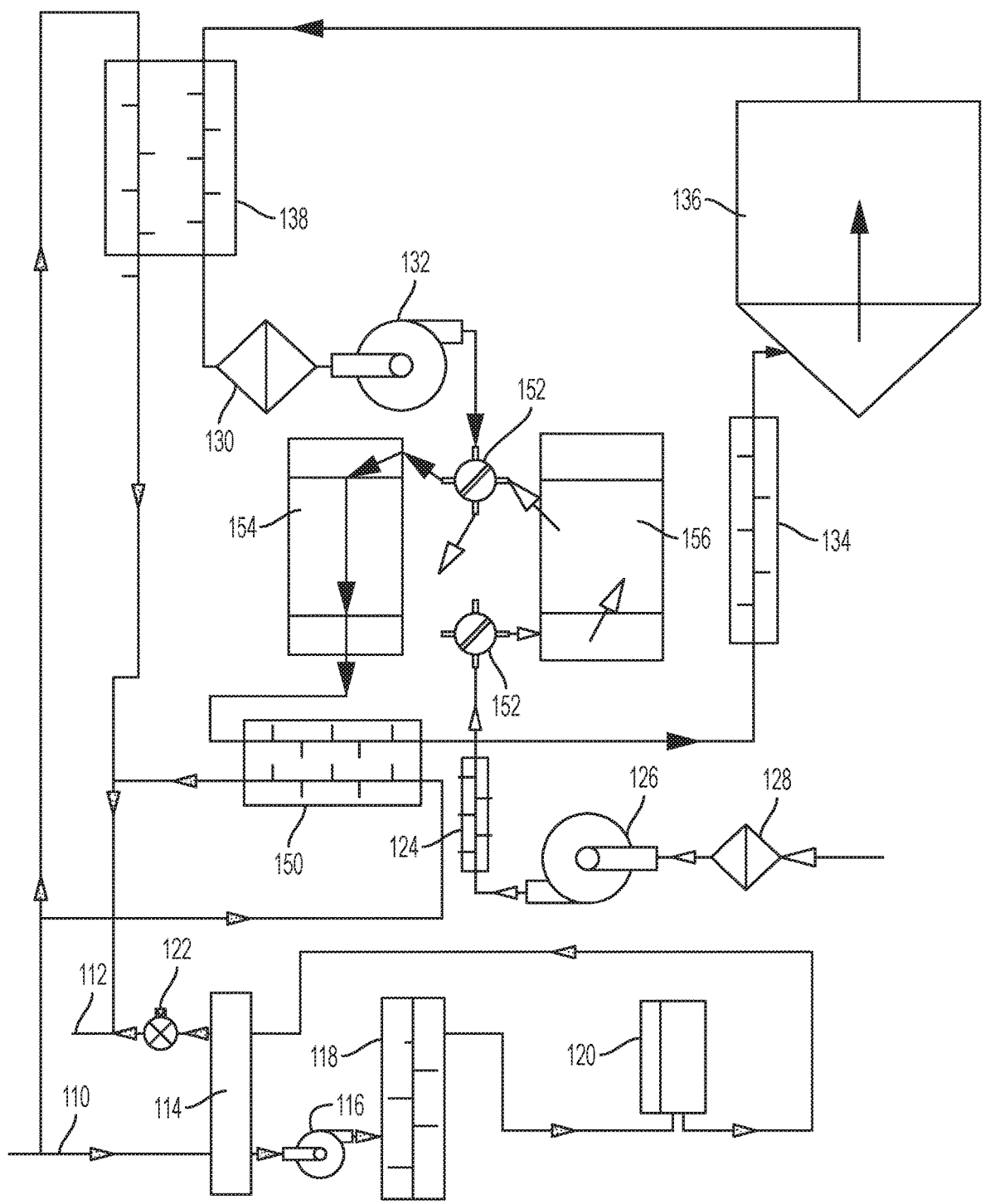
FIG. 2 is a schematic flow chart illustrating operation of a dual bed pellet desiccant dryer with an integral water process temperature control unit circuit according to the invention.

FIG. 2 is a schematic flow chart illustrating operation of a dual bed pellet desiccant dryer with an integral water process temperature control unit circuit according to the invention.

In FIG. 2:
110 is a water supply.
112 is a water return.
114 is a mixing chamber.
116 is a water pump.
118 is a water heater.
120 is a mold of an injection molding machine.
122 is a solenoid water cooling valve.
124 is a regeneration heater.
126 is a regeneration blower.
128 is a regeneration filter.
130 is a process filter.
132 is a process fan or blower.
134 is a process heater.
136 is a material drying hopper.
138 is a post process water to air heat exchanger.
150 is a process air precooler.
152 is a rotary valve assembly.
154 is a desiccant pellet bed supplying dry air to the process.
156 is a desiccant pellet bed undergoing regeneration.

Referring to FIG. 2, cold water enters at point 110, goes to mixing chamber 114, water pump 116, water heater 118, then through the mold 120 of an injection molding machine, and returns to mixing chamber 114, traveling all the while in a closed loop. Temperature sensors monitor the temperature of water going to the mold. If water temperature is too low, the water heater is energized, if the water temperature is too high, solenoid water cooling valve 122 is opened to permit hot water to drain. This hot water is replenished from a colder water supply that lowers temperature of water going into mold 120.

Still referring to FIG. 2, moist process air leaves material hopper 136, goes through post process air cooler 138 while allowing gaseous volatiles to condense (so as not to contaminate the desiccant) and then through process filter 130. This moist air is pumped by blower 132 through a rotary valve assembly 152 where the moist process air is diverted to the desiccant pellet bed supplying dry air to process 154 (the desiccant pellet bed) where the process air is optionally cooled in a process air pre-cooler 150 prior to being heated by process heater 134, if low process temperatures are required. Pre-cooler 150 eliminates the temperature spike of the process air when rotary valve 152 is shifted and a freshly regenerated desiccant bed 154 or 156 comes on line. This temperature spike may cause "bridging" of the material in hopper 136 if the material melts at lower temperatures.

Yet still referring to FIG. 2, ambient air is filtered by regeneration filter 128, then is pumped by blower 126, then is heated with regeneration heater 124 where the heated ambient air is diverted with rotary valve 152 to the desiccant pellet bed 156 undergoing regeneration. This hot regeneration air excites water bound to the desiccant and removes water vapor from desiccant bed 156. This wet, hot regeneration air is diverted by rotary valve 152 and vented to atmosphere.

Figure 3:
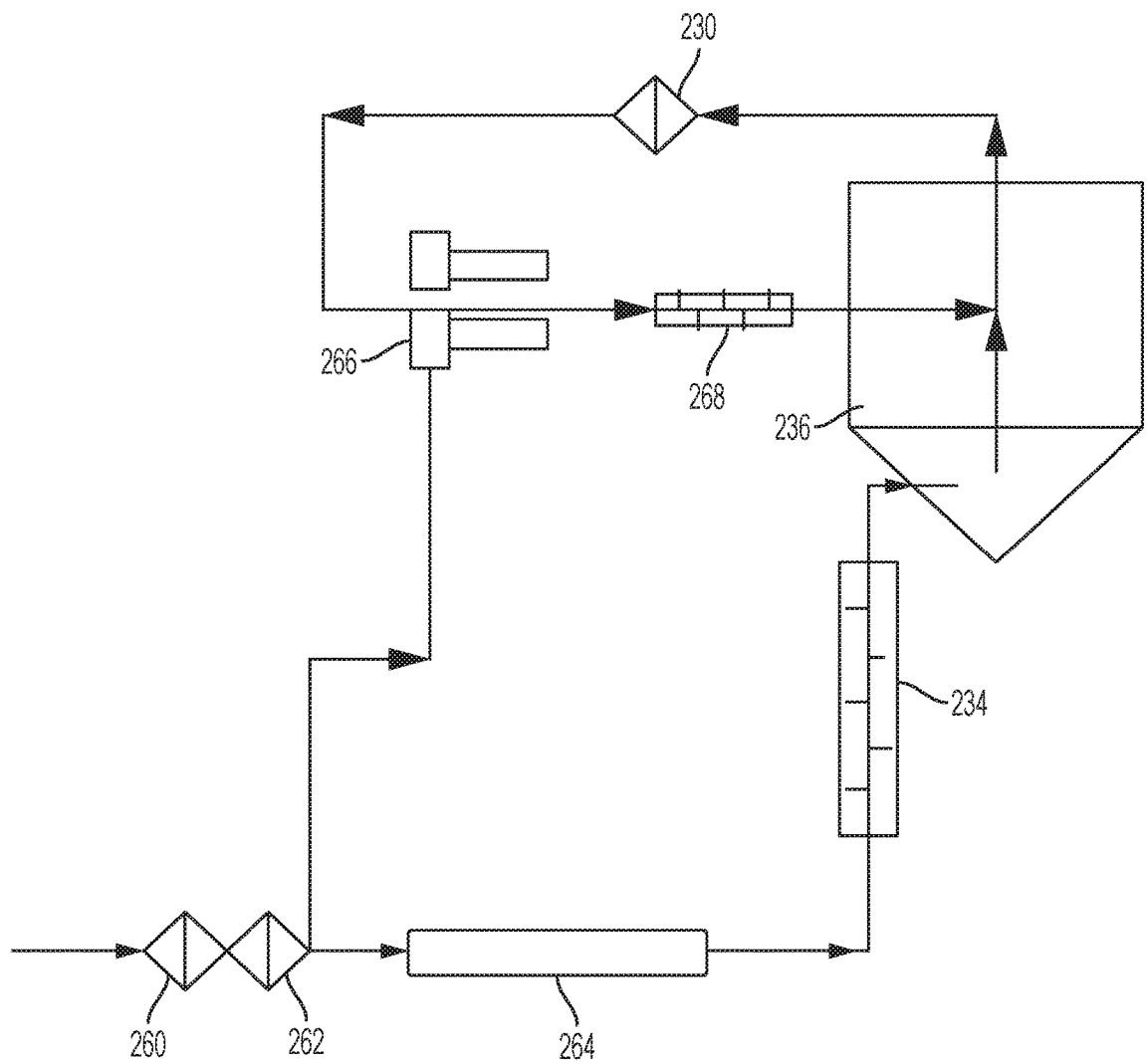
FIG. 3 is a schematic flow chart illustrating operation of a membrane dryer with an integral water process temperature control unit circuit according to the invention.
Figure 3:
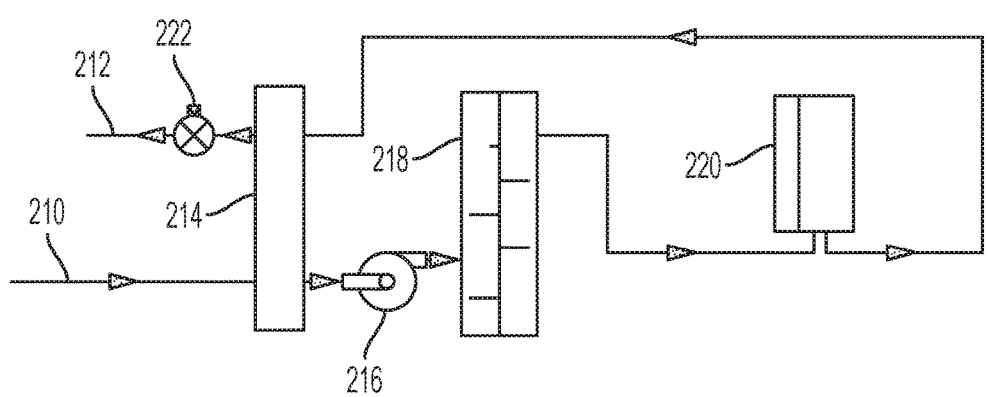

FIG. 3 is a schematic flow chart illustrating operation of a membrane dryer with an integral water process temperature control unit circuit according to the invention In FIG. 3:
210 is a water supply
212 is a water return
214 is a mixing chamber
216 is a water pump
218 is a water heater
220 is an injection mold
222 is a solenoid water cooling valve
230 is a process filter
234 is a process heater
236 is a material drying hopper
260 is a 1 micron coalescing air filter
262 is a 0.01 micron coalescing air filter
264 is a compressed gas membrane air dryer
266 is a venturi air amplifier
268 is a secondary process heater Referring to FIG. 3, cold water enters at point 210, goes to mixing chamber 214, water pump 216, water heater 218, then through the mold of an injection molding machine and returns to mixing chamber 214, all the while traveling in a closed loop. Temperature sensors monitor the temperature of water going to the mold. If the water temperature is too low, the heater is energized, if the temperature is too high, solenoid water cooling valve 222 is opened to permit hot water to drain. This hot water is replenished from a colder water supply that lowers the temperature of the water going to mold 220.

Still referring to FIG. 3, compressed air is supplied to the drying circuit and is filtered with a preferably 1 micron coalescing air filter 260 and with a preferably 0.01 micron coalescing air filter 262. The compressed air is split into two portions, one portion flowing to compressed gas membrane dryer 264, where the air is dried, then through process heater 234, where the dried air is heated, then to hopper 236 where the heated, dried air passes over the resin pellets to be dried. A second portion of the compressed air goes to Venturi air amplifier 266 where the compressed air mixes with and invades flow of moist return process air. The resulting air stream is reheated by secondary process heater 268 and enters the center of hopper 236 where this air pre-dries the resin material, and is recirculated through process filter 230 and air amplifier 266 in a continuous loop.

Figure 4:
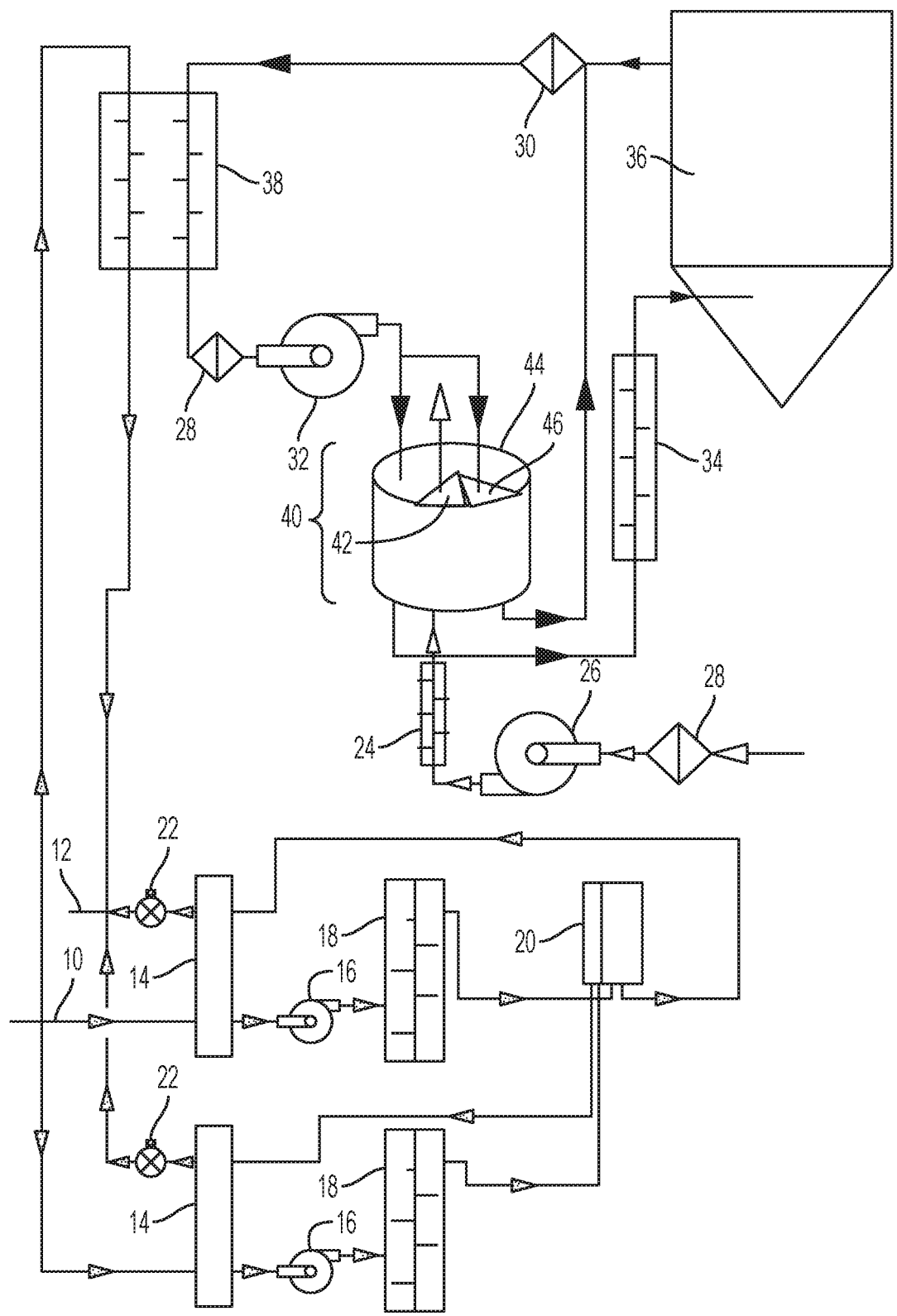
FIG. 4 is a flow chart similar to FIG. 1, using the same item numbering scheme and illustrating operation of a desiccant wheel dryer in combination with multiple integral water temperature control unit circuits which heat the cavity and core sections of the mold of an injection molding machine.

FIG. 4 is a flow chart similar to FIG. 1, using the same item numbering scheme and illustrating operation of a desiccant wheel dryer in combination with multiple integral water temperature control unit circuits which heat the cavity and core sections of the mold of an injection molding machine.

The following is claimed:

1. Apparatus for drying thermoplastic resin prior to molding into plastic parts, comprising:
   a. a continuous loop liquid circuit for furnishing liquid at a prescribed temperature to a mold in which the plastic parts are fabricated;
   b. a continuous loop air circuit for passing heated dry air through a hopper containing the thermoplastic resin thereby drying the thermoplastic resin to a prescribed level of dryness;
   c. a coupling thermally connecting the two circuits for heat transfer from the liquid to the drying air.

2. Apparatus of claim 1 wherein the liquid is selected from the group comprising water and ethylene glycol.

3. Apparatus of claim 1 further comprising
   a. a plurality of continuous loop liquid circuits for furnishing liquid at prescribed temperatures to a plurality of molds in which the plastic parts are fabricated; and
   b. couplings thermally connecting the liquid loop circuits to the air circuit for heat transfer from the liquid to the air.

* * * * *